United States Patent
Yamamoto et al.

(10) Patent No.: US 7,234,485 B2
(45) Date of Patent: Jun. 26, 2007

(54) TIRE VALVE

(75) Inventors: Masahiko Yamamoto, Giru-ken (JP); Hiroyuki Teratani, Tokyo (JP)

(73) Assignees: Pacific Industrial Co., Ltd., Gifu-ken (JP); Bridgestone Corporation, Tokyo (JP)

( * ) Notice: Subject to any disclaimer, the term of this patent is extended or adjusted under 35 U.S.C. 154(b) by 0 days.

(21) Appl. No.: 11/334,904

(22) Filed: Jan. 19, 2006

(65) Prior Publication Data

US 2006/0118173 A1 Jun. 8, 2006

Related U.S. Application Data

(63) Continuation of application No. PCT/JP2004/010118, filed on Jul. 15, 2004.

(30) Foreign Application Priority Data

Aug. 8, 2003 (JP) ............... 2003-290548

(51) Int. Cl.
  F16K 15/20 (2006.01)
  B60C 29/06 (2006.01)
  B01D 35/04 (2006.01)
(52) U.S. Cl. .............. 137/223; 137/550; 141/38; 152/415; 152/429
(58) Field of Classification Search ............. 137/223, 137/550; 141/5, 9, 38; 152/415, 425, 427, 152/DIG. 7, DIG. 11, 317; 210/429
See application file for complete search history.

(56) References Cited

U.S. PATENT DOCUMENTS

| | | | | | |
|---|---|---|---|---|---|
| 799,859 | A | * | 9/1905 | Macgowan | 152/317 |
| 3,230,999 | A | * | 1/1966 | Hicks | 152/450 |
| 4,987,937 | A | * | 1/1991 | Nowicke | 137/550 |
| 5,479,975 | A | | 1/1996 | Fogal, Sr. et al. | |
| 5,803,108 | A | | 9/1998 | Schuessler, Jr. et al. | |
| 6,035,885 | A | | 3/2000 | Schuessler, Jr. et al. | |
| 6,672,328 | B2 | * | 1/2004 | Colussi et al. | 152/415 |
| 6,880,598 | B2 | * | 4/2005 | Haunhorst et al. | 137/223 |

FOREIGN PATENT DOCUMENTS

| | | |
|---|---|---|
| JP | 51-126604 S | 11/1976 |
| JP | 61-141873 U | 9/1986 |
| JP | 2003-118313 A | 4/2003 |

* cited by examiner

*Primary Examiner*—John Rivell

(74) *Attorney, Agent, or Firm*—Akin Gump Strauss Hauer + Feld LLP

(57) ABSTRACT

Hollow particle can be charged into a tire when a second stem is disconnected from a first stem in a tire valve of the present invention. When the second stem is fitted in the first stem, the hollow particle is sealed in the tire by a filter provided on the second stem and a gas can be charged into the tire through a valve core provided on the second stem.

9 Claims, 6 Drawing Sheets

TIRE VALVE

CROSS-REFERENCE TO RELATED APPLICATIONS

This application is a continuation of International Application No. PCT/JP2004/010118, filed Jul. 15, 2004, the disclosure of which is incorporated herein by reference.

BACKGROUND OF THE INVENTION

1. Field of the Invention

The present invention relates to a tire valve mounted on a tire.

2. Description of the Related Art

There has conventionally been provided a technique for charging a predetermined amount of hollow particle and a gas into a tire so that decreased internal pressure of the tire due to damage is restored (see Patent document). This is a new technique in which ride comfortableness can be avoided from reduction due to deterioration in the rolling resistance or weight increase in the tire since this technique necessitates no reinforcement in side walls of the tire.

Furthermore, since the aforesaid new technique can be realized with the use of a general-purpose tire and a general-purpose wheel, no special wheel as employed in a run-flat tire having core and no special-purpose rim-assembling jig are necessitated. Thus, the technique has an advantage in that existing infrastructure can be utilized with the tire.

However, general-purpose tires have only a single valve mounting hole through which a tire valve is mounted. Accordingly, in order that the aforesaid new technique may be applied to general-purpose wheels, a new tire vale is necessitated which can allow not only the hollow particle and gas to flow therethrough but also allow only the gas to flow therethrough in maintenance work such as increase or decrease in the tire internal pressure by the user.

Furthermore, it is important from the view point of productivity that hollow particle should be charged into the tire as quickly as possible. Additionally, it is also important in fulfilling versatility that the aforesaid new tire valve should also be used with a general-purpose air chuck and a general-purpose valve core used with conventional general-purpose tire valves in the maintenance work of increase or decrease in the tire internal pressure by the user. Patent document: JP-A-2003-118313 (paragraphs [0034] to [0039] and FIG. 1)

BRIEF SUMMARY OF THE INVENTION

Therefore, an object of the present invention is to provide a tire valve which can be used with a tire charged with hollow particle.

The present invention provides a tire valve for use with a tire which is charged with hollow particle and a gas, comprising a valve stem formed into a cylindrical shape and communicating with an interior and an exterior of the tire, a valve core mounted in the valve stem, and a filter provided in the valve stem so as to close the interior of the valve stem inner than the valve core, thereby blocking the hollow particle and allowing only the gas to pass to the valve core side.

In the tire valve of the present invention, the filter capable of passing only the gas therethrough is provided inner than the valve core in the valve stem. Accordingly, the hollow particle charged in the tire can be prevented from entering the valve core. Consequently, the general-purpose valve core is normally operated such that the gas can be charged into and discharged from the tire. Accordingly, general-purpose air pumps and pressure gages can be used.

Here, it is preferable that the filter is a nonwoven cloth. The nonwoven cloth has a filtration accuracy capable of removing hollow particle in a filter performance test prescribed by JIS-B8356-8 or ISO16889. Accordingly, hollow particle can be prevented from entering the valve core more reliably and from accumulating in and clogging the valve core.

The tire valve may comprise a second stem having both ends closed by the valve core and the filter respectively, and a first stem fixed to the tire and removably fitted by the second stem. Consequently, hollow particle can be charged into the tire easily and quickly when the second stem leaves the first stem. When the second stem is fitted in the first stem, hollow particle is encapsulated in the tire by the filter provided on the second stem, whereupon gas can be charged into the tire through the valve core of the second stem. Thus, according to the tire valve of the present invention, both gas and hollow particle can be charged into the tire.

The second stem preferably includes a pinching portion pinching a peripheral edge of the filer. Furthermore, the pinching portion may include an end wall formed on one of the ends of the second stem so as to be directed axially and to which the peripheral edge of the filter is applied, and a cylindrical wall standing from an outer edge of the end wall and having a distal end crimped to the end wall side so that the peripheral edge of the filter is held between the end wall and the cylindrical wall.

The pinching portion may further comprise an annular member interposed between the peripheral edge of the filter and the crimped distal end of the cylindrical wall, a pair of annular protrusions formed on the end wall and the annular member so as to protrude and having different diameters respectively. The peripheral edge of the filter may be bent into the shape of a crank by the annular protrusions, whereupon a pinching force can be improved.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

One embodiment of the present invention will be described with reference to FIGS. 1 to 3.

Figure 1:
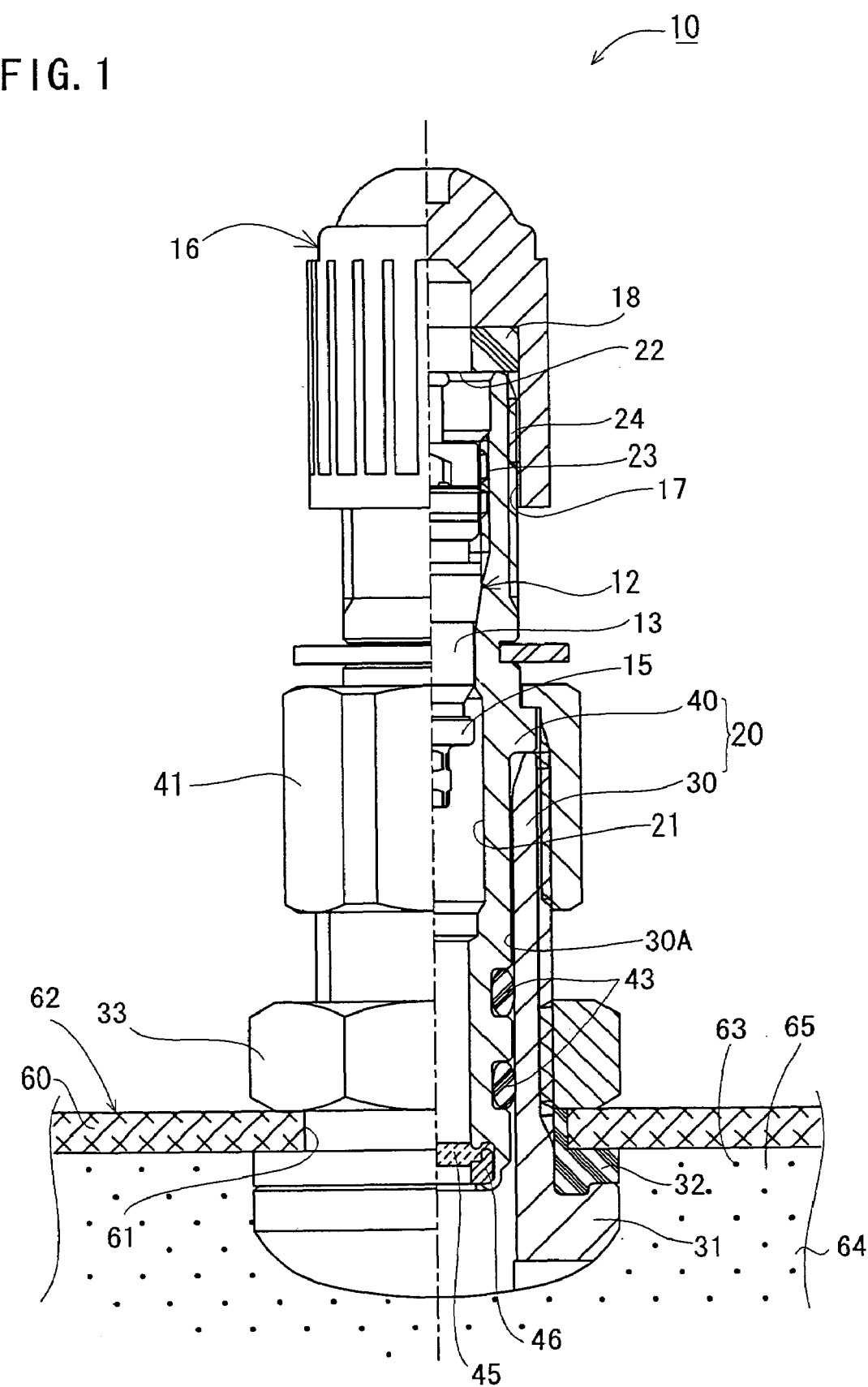
FIG. 1 is a side sectional view of the tire valve in accordance with a first embodiment of the present invention.

FIG. 1 illustrates part of a rim 60 and tire body 64 fixed to an outside of the rim 60 of a tire 62. An interior of the tire 62 is charged with a gas 65 (air in the embodiment) and hollow particle 63 (grain diameter of about 100 μm in the embodiment, for example). A tire valve 10 of the embodiment is fixed through the rim 60 of the tire 62.

Figure 2:
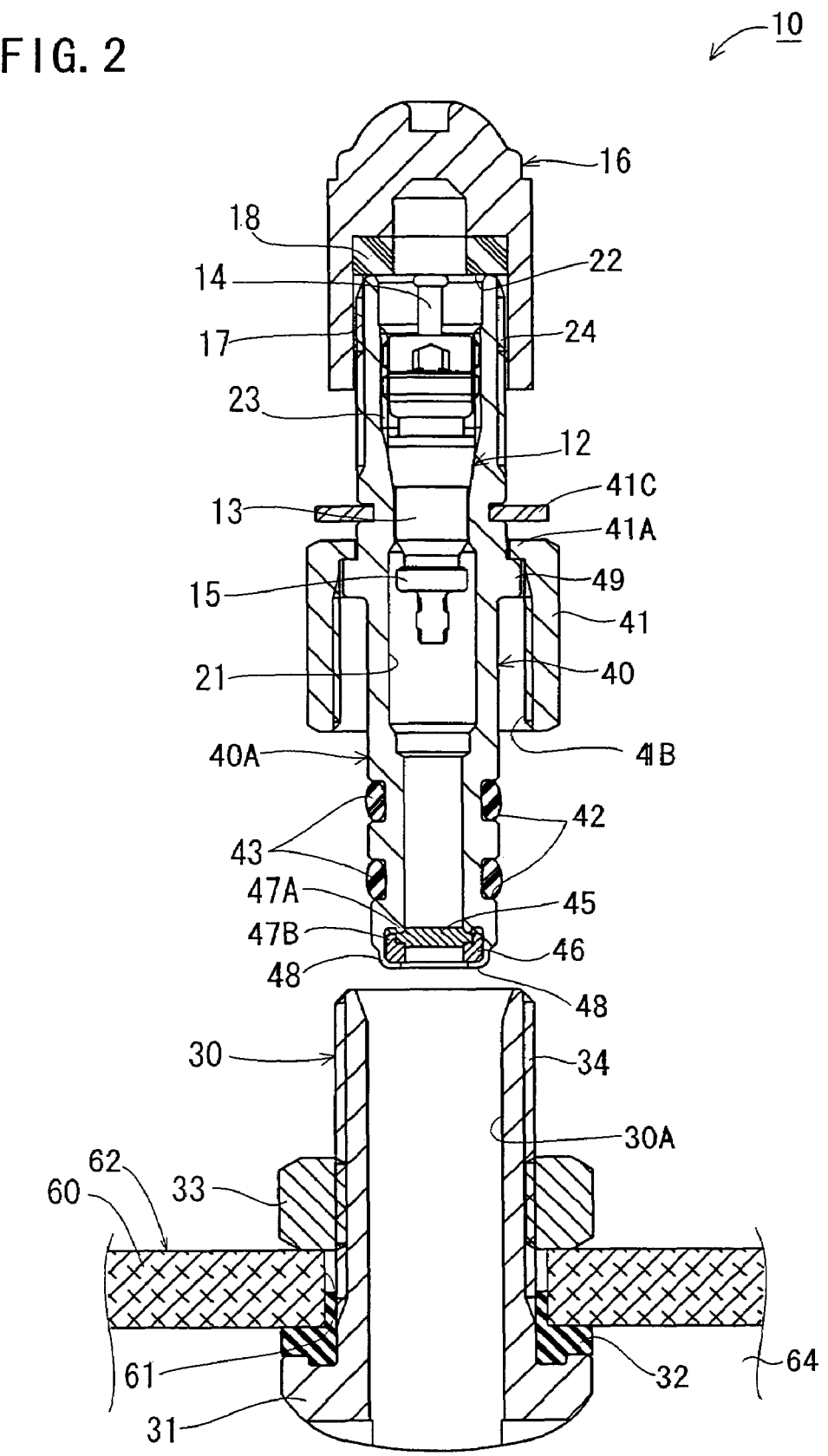
FIG. 2 is a side sectional view of the tire valve with the first and second stems being separated.

The tire valve 10 comprises a cylindrical valve stem 20 and a valve core 12 provided in the valve stem as shown in FIG. 2. The valve stem 20 includes a first stem 30 fixed through the rim 60 of the tire 62 and a second stem 40 fitted with the first stem 30.

The first stem 30 is formed into a cylindrical shape and has an outer surface formed with a thread 34 and a flange 31 protruding sidewise from a proximal end thereof. The first stem 30 is inserted through a valve insertion hole 61 formed in the rim 60 from inside the tire 62 (lower side as viewed in FIG. 2). An edge of the valve insertion hole 61 is sandwiched between a nut 33 in threading engagement with the thread 34 and the flange 31, whereby the first stem 30 is fixed. A packing 32 is further sandwiched between the flange 31 and the edge of the valve insertion hole 61. The first stem 30 has an inner diameter of 7 mm.

The second stem 40 is formed into the shape of a cylinder slenderer than the first stem 30 and includes a middle part from which a middle flange 49 protrudes sidewise. An insertion part 40A which is located nearer to one end than the middle flange 49 is fitted into the first stem 30. A cylindrical nut 41 is fitted with an outer surface of the second stem 40 from the side opposite to the insertion part 40A. An inner protrusion 41A protruding inside from one end of the cylindrical nut 41 is engaged with the middle flange 49, and the other end of the cylindrical nut 41 covers the outside of the insertion part 40A. A thread 41B formed inside the cylindrical nut 41 is brought into threading engagement with the thread 34 of the first stem 30, so that the second stem 40 is prevented from falling off from the first stem 30.

A clip 41C is attached in a groove formed in the vicinity of the middle flange 49 of the second stem 40 to prevent the cylindrical nut 41 from falling off.

Grooves 42 are formed in an outer circumferential surface of the insertion part 40K so as to be axially parallel with each other. O-rings 43 are attached in the grooves 42 respectively and pressed between circumferential surfaces of the first stem 30 and the insertion part 40A, thereby providing a seal therebetween (see FIG. 1).

A thread 24 is formed in an outer circumferential surface of a part of the second stem 40 opposed to the insertion part 40A with the middle flange 49 located therebetween. A valve cap 16 is in threading engagement with the thread 24. The valve cap 16 is formed into a cylindrical shape with a bottom at one end. An annular rubber plate 18 is placed on an inner surface of the valve cap 16. The rubber plate 18 is adapted to be pressed against an opening edge of a charge port 22 provided in an end of the second stem 40.

The second stem 40 has a female thread 23 formed in an inner circumferential surface of the end thereof where the valve cap 16 is attached. A valve core 12 is in threading engagement with the female thread 23. The valve core 12 includes a cylindrical core body 13 and a movable shaft 14 extending through an interior of the core body 13. The movable shaft 14 is biased toward one side by a coil spring (not shown) provided in the core body 13. The biasing force presses a valve element 15 provided on one end of the movable shaft 14 against one end surface of the core body 13. Consequently, the valve core 12 is normally closed such that a flow path 21 inside the second stem 40 is shut off. When the movable shaft 14 is pushed at the charge port 22 side or compressed air is charged into the charge port 22, the valve element 15 is departed from the end surface of the core body 13, whereby the valve core 12 is opened thereby to open the flow path 21.

Figure 3:
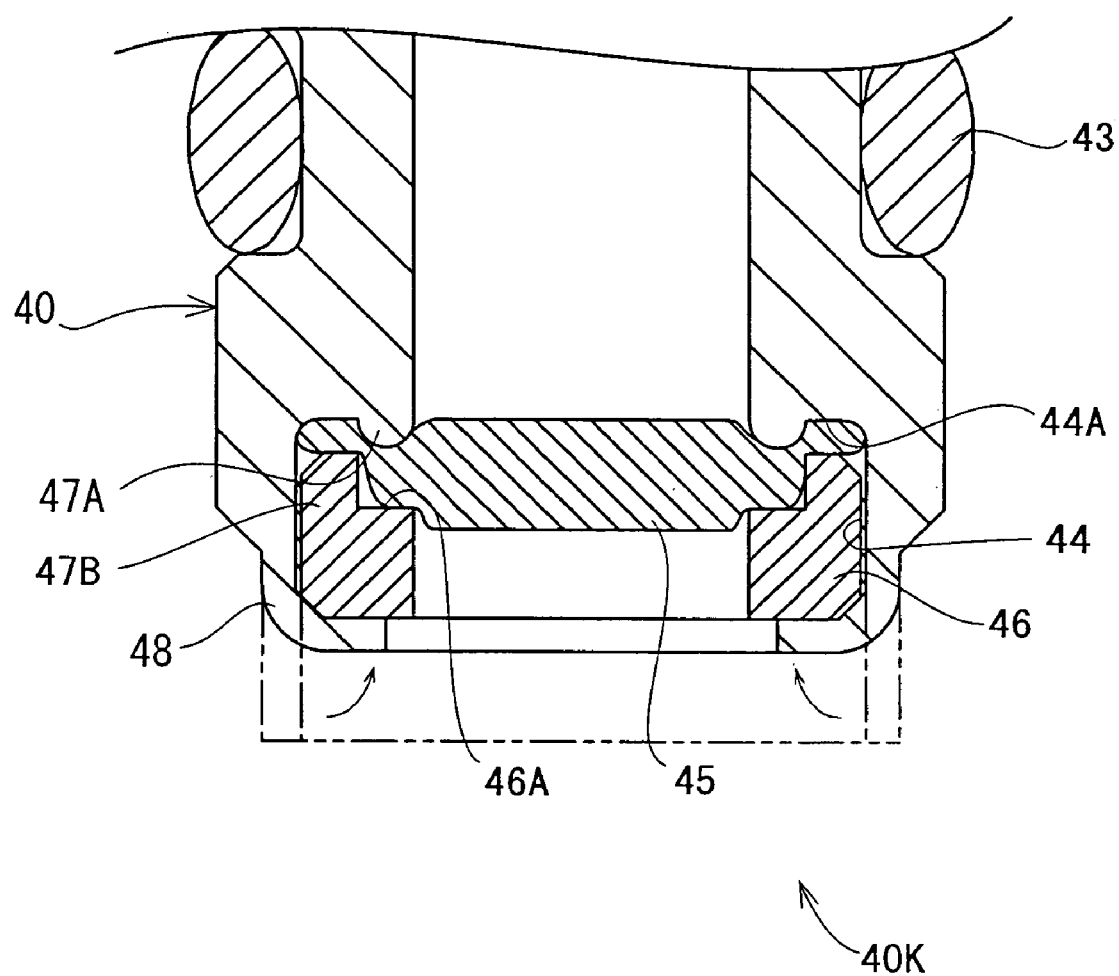
FIG. 3 is a side sectional view of a terminal portion of the second stem.

The insertion part 40A of the second stem 40 has a distal end provided with a pinching portion 40K pinching a filter 45 as shown in FIG. 3. The filter 45 comprises a nonwoven cloth cut into a disc shape. The nonwoven cloth has a texture finer than a grain diameter (about 100 μm, for example) of hollow particle 63 (see FIG. 1) to be charged into the tire 62. More specifically, it is preferable that the nonwoven cloth is product No. 343 (filtration accuracy ranging from 7 to 10 μm in a filter performance test prescribed by JIS-B8356-8) manufactured by Azumi Filter Paper Co., Ltd. Consequently, the gas 65 (see FIG. 1) can pass through the filter 45 although the hollow particle 63 cannot. The nonwoven cloth may also be product No. 337 or 340 manufactured by Azumi Filter Paper Co., Ltd.

The pinching portion 40K has a larger-diameter portion 44 formed by enlarging an inner diameter of the distal end of the second stem 40 into a stepped shape. The larger-diameter portion 44 has an inner wall serving as an axial end wall 44A in the present invention. The larger-diameter portion 44 has a circumferential wall serving as a cylindrical wall 48 in the present invention. Furthermore, the cylindrical wall 48 has a thinner distal end. The annular member 46 is fitted with the inside of the larger-diameter portion 44 while the filter 45 is applied to the end wall 44A. Furthermore, the distal end thinner portion of the cylindrical wall 48 is crimped so as to be superposed on the annular member 46 thereby to be pushed down inwardly.

A first annular protrusion 47A protrudes from an inner edge of the end wall 44A, and a second annular protrusion 47B protrudes from an outer edge of the annular member 46. A circumferential edge of the filter 45 is caught in a gap between the end wall 44A and the annular member 46 while being pressed by the first and second annular members 47A and 47B to be bent into the shape of a crank.

The operation and effect of the embodiment will now be described.

When the gas 65 and hollow particle 63 are to be charged into the tire 62, a predetermined amount of hollow particle 63 is first charged into the tire 62 and then, the gas 65 is charged into the tire 62 so that an inner pressure of the tire reaches a predetermined value.

More specifically, the second stem 40 is detached from the first stem 30, and a hollow particle charging hose (not shown) is connected to the upper end opening of the first stem 30 so that the hollow particle 63 is charged into the tire 62. The hollow particle 63 may be force-fed into the tire 62 by a pump (not shown) or the gas 65 in the tire 62 may be absorbed so that pressure in the tire 62 is reduced, and the hollow particle 63 may be absorbed into the tire 62 by pressure difference between the interior and exterior of the tire 62. Since the hollow particle 63 is charged through the first stem 30 into the tire 62, the charging work can be carried out easily and quickly.

When the charge of the hollow particle 63 has been completed, the second stem 40 is fitted into the first stem 30. Then, the hollow particle 63 is sealed in the tire 62 by the filter 45 provided in the second stem 40, whereupon the gas 65 is chargeable into the tire 62 through the valve core 12 provided in the second stem 40. Even when the hollow particle 63 adheres to the outer surface of the second stem 40 during this while, the hollow particle 63 can be prevented from adhering to the valve core 12 since one end of the valve core 12 is protected against the hollow particle 63 by the valve cap 16 whereas the other end of the valve core 12 is protected against the hollow particle 63 by the filter 45.

When the second stem 40 has been fitted into the first stem 30, the hollow particle 63 adherent to the outer surface of the tire 62 is removed. The valve cap 16 is then detached from the second stem 40 and a general-purpose air pump (not shown) is connected to the charge port 22 so that the gas 65 (see FIG. 1) is supplied into the tire 62.

When the shaft 14 of the valve core 12 is depressed for adjustment of internal pressure of the tire 62 after completion of charge of gas 65, the gas 65 mixed with the hollow particle 63 flows toward the tire valve 10. However, the hollow particle 63 is blocked by the filter 45 such that only the gas 65 passes through the filter 45 along the valve core 12 to be discharged into the exterior of the tire 62. Consequently, the internal pressure of the tire 62 can be measured by the use of a conventional pressure gauge (Bourdon tube pressure gauge, for example).

According to the tire valve 10 of the embodiment, the filter 45 capable of passing only the gas 65 therethrough is provided inner than the valve core 12 in the valve stem 20. Accordingly, the hollow particle 63 charged in the tire 62 is prevented from entering the valve core 12. Consequently, the valve core 12 is normally operated such that the gas 65 can be charged into and discharged from the tire 62. Furthermore, both gas 65 and hollow particle 63 can be charged into the tire 62.

The invention will be described more specifically by comparison between the embodiment and a comparative example.

The construction of the tire valve 10 of the embodiment in accordance with the present invention was as follows. The first stem 30 had an inner diameter of 7 mm, and nonwoven cloth (thickness: 1.00 mm, pressure loss: 5 Pa, and burst strength: 529 kPa) of product No. 343 manufactured by Azumi Filter Paper Co., Ltd. was used as the filter 45.

The comparative example differed from the embodiment only in that the filter 45 was not provided in the comparative example and was the same as the tire valve 10 of the embodiment in the other respect.

The hollow particle 63 and the gas 65 were charged into the tire by the above-described charging method using the tire valve 10 of the embodiment and a tire valve of the comparative example. Thereafter, the valve core 12 was operated so that the internal pressure of the tire was reduced.

TABLE 1

|  | Comparative example | Embodiment |
|---|---|---|
| Inner diameter of first valve | 7 mm | 7 mm |
| Filter | Not provided | Provided |
| Condition during pressure reduction after charge of hollow particle | Gas and hollow particle burst forth | Only gas burst forth |
| Determination of utility | Unusable | Usable |

As shown in the above TABLE 1, the hollow particle 63 burst forth through the tire valve as well as air 65 in the tire valve of comparative example when the internal pressure of the tire was reduced. On the other hand, in the case of the tire valve 10 of the embodiment, only the gas 65 burst forth without burst of hollow particle 63 when the internal pressure of the tire was reduced.

The present invention should not be limited by the foregoing embodiment but the following embodiments fall within the technical scope of the invention. Furthermore, the invention can be modified into various forms other than the following in practice without departing from the gist.

Figure 4:
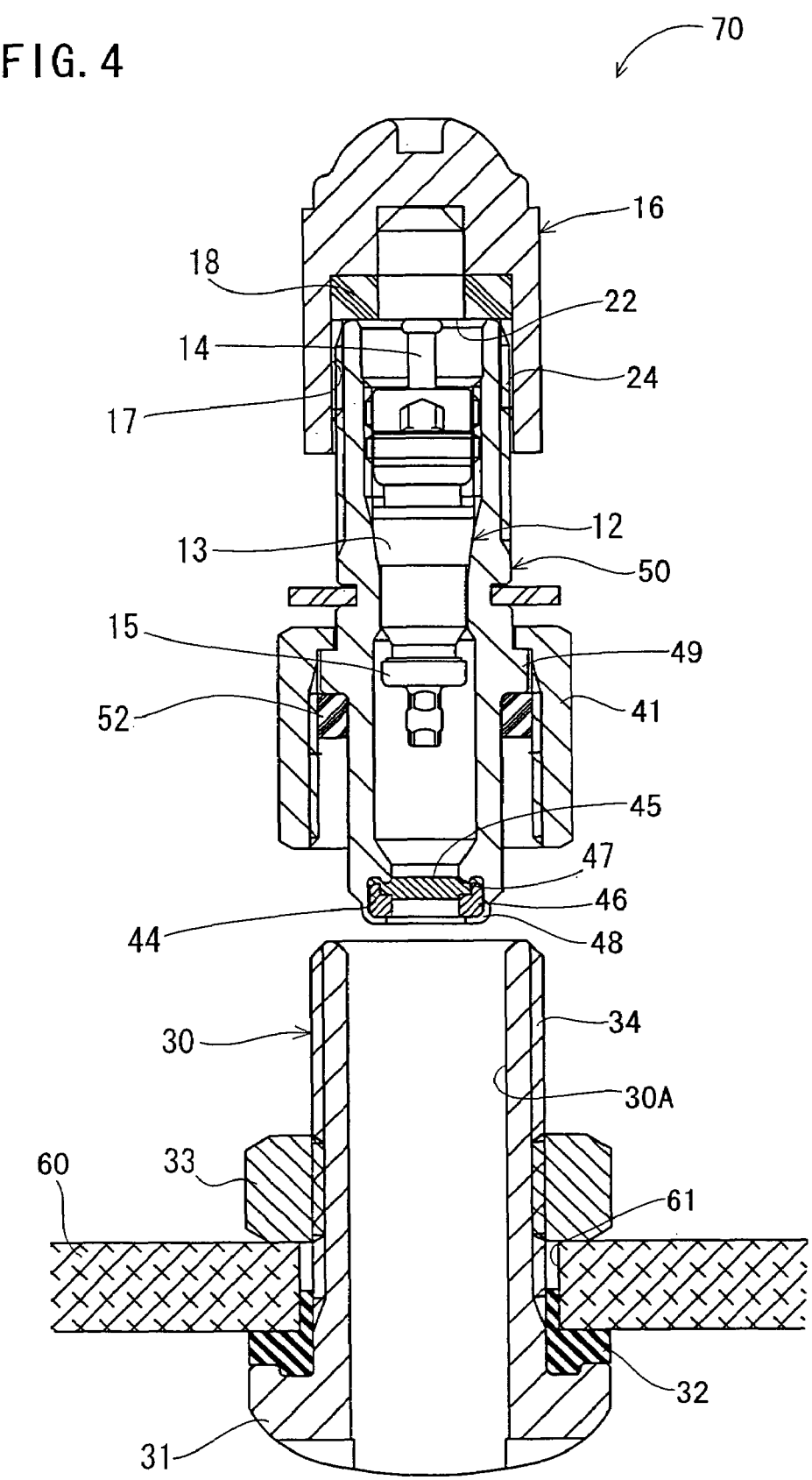
FIG. 4 is a side sectional view of the tire valve of another embodiment.

(1) Although the O-ring 43 is provided on the outer circumference of the insertion part 40A to seal the gap between the first and second stems 30 and 40 in the foregoing embodiment, a packing 52 may be provided under the middle flange 49 and be pinched between the middle flange 49 and the distal end of the first stem 30 thereby to be pressed, thereby sealing the gap between the first and second stems 30 and 40, as shown in FIG. 4, for example.

Figure 5:
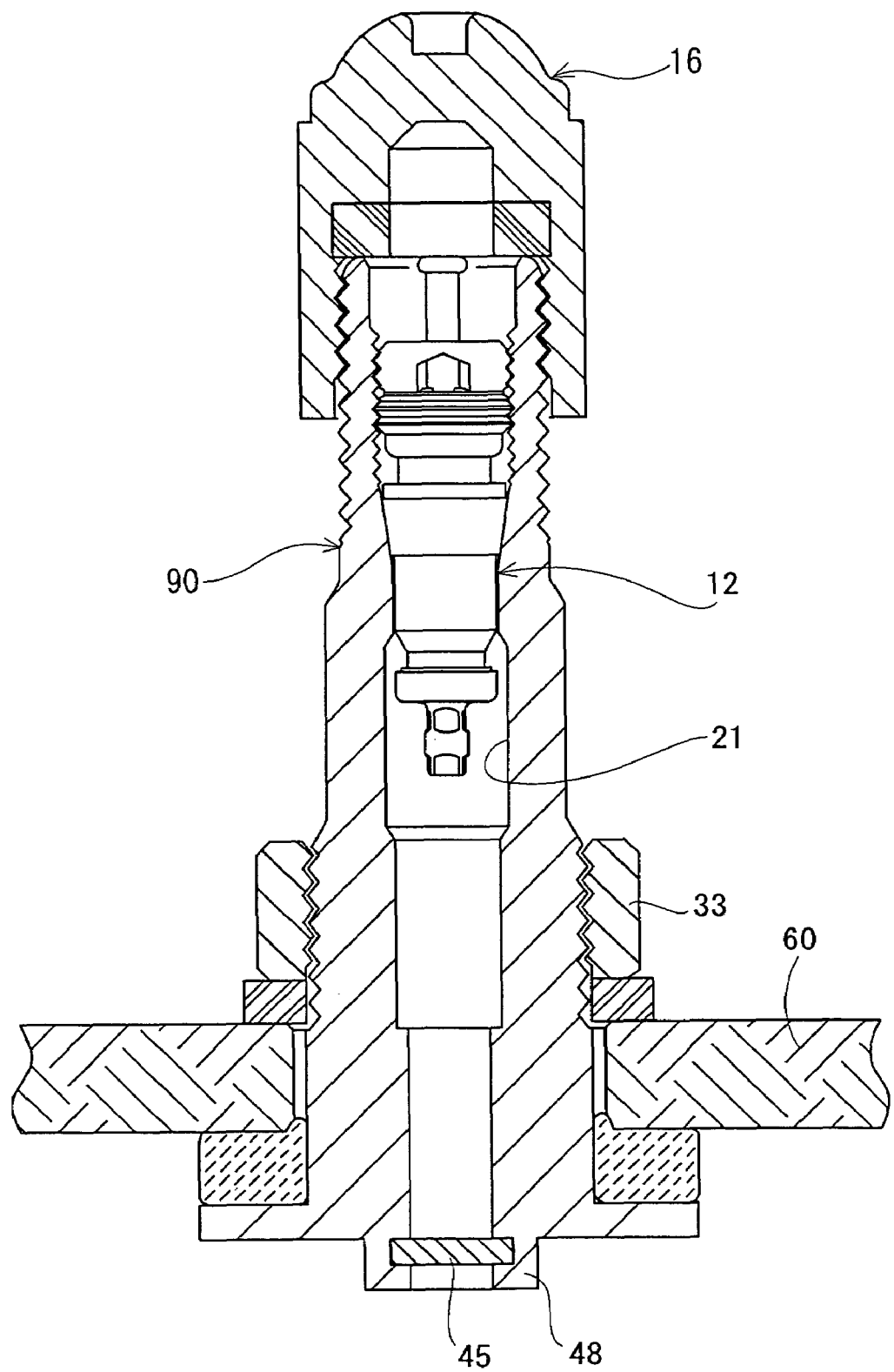
FIG. 5 is a side sectional view of the tire valve of further other embodiments.

(2) Although the valve stem 20 is dividable into the first and second stems 30 and 40 in the foregoing embodiment, the valve core 12 may be attached to one end side of a valve stem 90 undividable into first and second stems and the filter 45 may be attached to the other end side of the valve stem, as shown in FIG. 5. In this construction, too, hollow particle 63 can be prevented from flowing into the valve stem 90.

(3) Although the annular member 46 is interposed between the crimped cylindrical wall 48 and the filter 45 in the foregoing embodiment, the crimped cylindrical wall 48 may be pressed directly against the filter 45 as shown in FIG. 5.

(4) Although the filter 45 is attached to the terminal opening of the second stem 40 in the foregoing embodiment, the filter 45 may be attached to any location nearer to the tire 62 side than the valve core 12 of the second stem 40.

Figure 6:
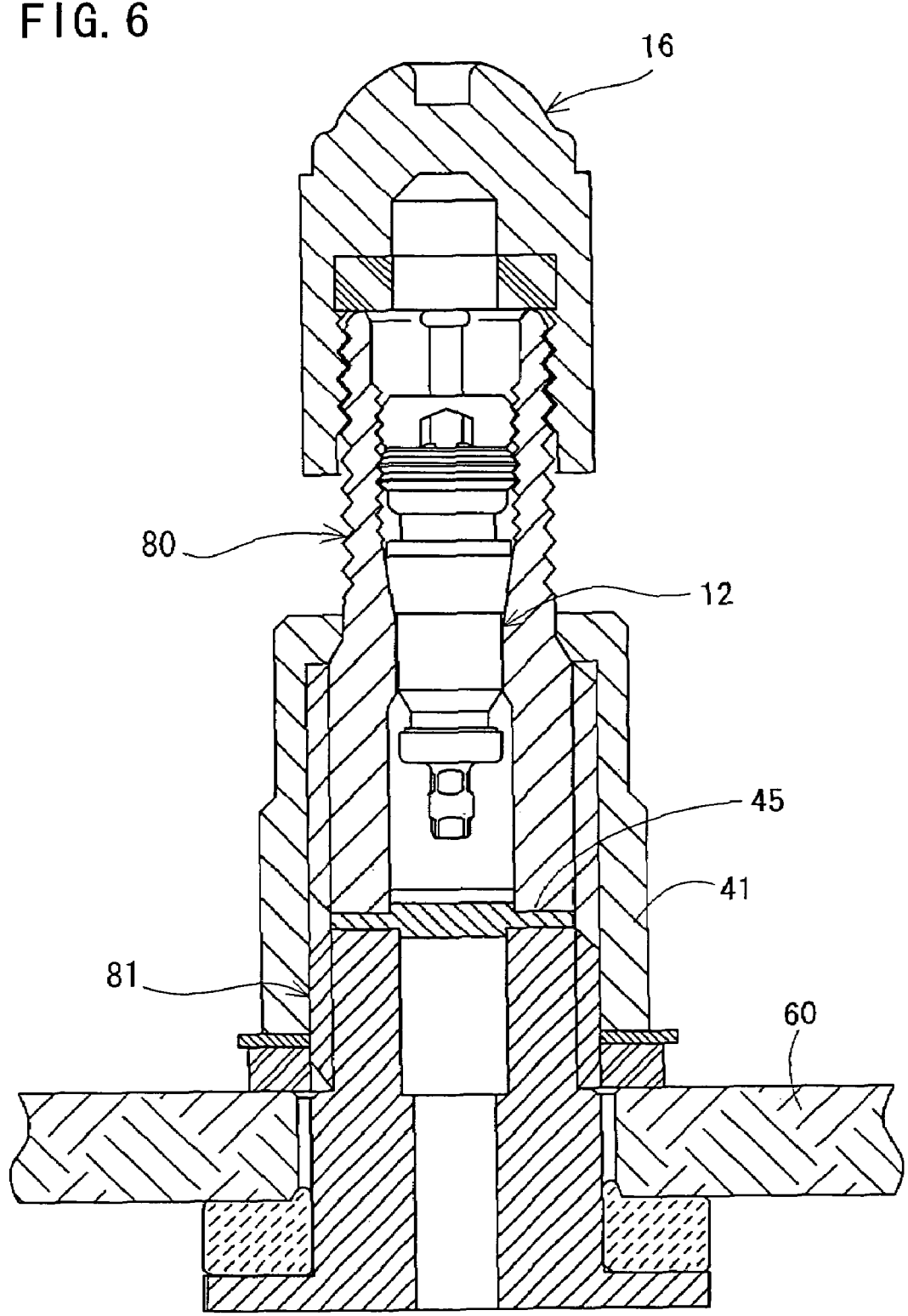
FIG. 6 is a side sectional view of the tire valve of further another embodiment.

(5) Although the filter 45 is pinched by the second stem 40 in the foregoing embodiment, the circumferential edge of the filter 45 may be pinched between one end of the second stem 80 and one end of the first stem 81, as shown in FIG. 6, for example.

(6) Although the filter 45 is nonwoven cloth in the foregoing embodiment, the filter 45 is not limited to the nonwoven cloth. If hollow particle 63 suspended in the gas 65 can be removed so that only the gas 65 is allowed to pass, a glass fiber filter or a filter made of polyurethane foam may be used, for example. Furthermore, texture of the filter 45 may be set according to the grain diameter of the hollow particle 63 to be charged into the tire.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A tire valve for use with a tire which is charged with a hollow particle and a gas, comprising:

a valve stem formed into a cylindrical shape and communicating with an interior and an exterior of the tire and including a first and second stem, the first stem being fixed to the tire and removably fitted by the second stem, the first stem being constructed so that the hollow particle is capable of being charged into the tire when the first stem has been removed from the second stem;

a valve core mounted in the valve stem; and a filter provided in the valve stem so as to close part of the interior of the valve stem inner than the valve core, thereby blocking the hollow particle and allowing the gas to pass to the valve core side;

wherein the second stem has both ends closed by the valve core and the filter respectively and the second stem includes a pinching portion pinching a peripheral edge of the filter.

2. The tire valve according to claim 1, wherein the pinching portion includes an end wall formed on one of the ends of the second stem so as to be directed axially and to which the peripheral edge of the filter is applied, a cylindrical wall standing from an outer edge of the end wall and having a distal end crimped to the end wall side so that the peripheral edge of the filter is held between the end wall and the cylindrical wall.

3. The tire valve according to claim 2, further comprising an annular member interposed between the peripheral edge of the filter and the crimped distal end of the cylindrical wall, a pair of annular protrusions formed on the end wall and the annular member so as to protrude and having different diameters respectively, wherein the annular protrusions are pressed against the peripheral edge of the filter.

4. A tire valve for use with a tire which is charged with a hollow particle and a gas, comprising:

a valve stem formed into a cylindrical shape and communicating with an interior and an exterior of the tire and including a first and second stem, the first stem being fixed to the tire and removably fitted by the second stem, the first stem being constructed so that the hollow particle is capable of being charged into the tire when the first stem has been removed from the second stem;

a valve core mounted in the valve stem; and a filter comprising a nonwoven cloth being provided in the valve stem so as to close part of the interior of the valve stem inner than the valve core, thereby blocking the hollow particle and allowing the gas to pass to the valve core side;

wherein the second stem has both ends closed by the valve core and the filter respectively and includes a pinching portion pinching a peripheral edge of the filter.

5. The tire valve according to claim 4, wherein the pinching portion includes an end wall formed on one of the ends of the second stem so as to be directed axially and to which the peripheral edge of the filter is applied, a cylindrical wall standing from an outer edge of the end wall and having a distal end crimped to the end wall side so that the peripheral edge of the filter is held between the end wall and the cylindrical wall.

6. The tire valve according to claim 5, further comprising an annular member interposed between the peripheral edge of the filter and the crimped distal end of the cylindrical wall, a pair of annular protrusions formed on the end wall and the annular member so as to protrude and having different diameters respectively, wherein the annular protrusions are pressed against the peripheral edge of the filter.

7. A tire valve for use with a tire which is charged with a hollow particle and a gas, comprising:

a valve stem formed into a cylindrical shape and communicating with an interior and exterior of the tire, the valve stem including first and second stems, the first stem being fixed to the tire and removably fitted by the second stem, the first stem being constructed so that the hollow particle is capable of being charged into the tire when the first stem has been removed from the second stem;

a valve core mounted in the valve stem;

a filter provided in the valve stem so as to close part of the interior of the valve stem inner than the valve core, thereby blocking the hollow particle and allowing the gas to pass to the valve core side, the filter being comprised of a nonwoven cloth, having a filtration accuracy sufficient to remove the hollow particle in a filter performance test prescribed by JIS-B8356-8 or ISO16889;

wherein the second stem has both ends closed by the valve core and the filter respectively and includes a pinching portion pinching a peripheral edge of the filter.

8. The tire valve according to claim 7, wherein the pinching portion includes an end wall formed on one of the ends of the second stem so as to be directed axially and to which the peripheral edge of the filter is applied, a cylindrical wall standing from an outer edge of the end wall and having a distal end crimped to the end wall side so that the peripheral edge of the filter is held between the end wall and the cylindrical wall.

9. The tire valve according to claim 8, further comprising an annular member interposed between the peripheral edge of the filter and the crimped distal end of the cylindrical wall, a pair of annular protrusions formed on the end wall and the annular member so as to protrude and having different diameters respectively, wherein the annular protrusions are pressed against the peripheral edge of the filter.

* * * * *